(12) United States Patent
Kovarsky

(10) Patent No.: US 6,878,258 B2
(45) Date of Patent: Apr. 12, 2005

(54) APPARATUS AND METHOD FOR REMOVING CONTAMINANTS FROM SEMICONDUCTOR COPPER ELECTROPLATING BATHS

(75) Inventor: Nicolay Kovarsky, Sunnyvale, CA (US)

(73) Assignee: Applied Materials, Inc., Santa Clara, CA (US)

(*) Notice: Subject to any disclaimer, the term of this patent is extended or adjusted under 35 U.S.C. 154(b) by 428 days.

(21) Appl. No.: 10/074,569

(22) Filed: Feb. 11, 2002

(65) Prior Publication Data

US 2003/0150736 A1 Aug. 14, 2003

(51) Int. Cl.⁷ .............................................. B01D 61/44
(52) U.S. Cl. ...................... 205/99; 205/101; 204/528; 204/529; 204/634; 204/DIG. 13
(58) Field of Search ............... 205/99, 101; 204/528, 204/529, 634, DIG. 13

(56) References Cited

U.S. PATENT DOCUMENTS

| | | | |
|---|---|---|---|
| 4,171,255 A | 10/1979 | Tuznik et al. ................ 204/238 |
| 4,324,629 A | * 4/1982 | Oka et al. .................... 204/528 |
| 4,383,901 A | 5/1983 | Smith et al. ................. 204/152 |
| 4,436,601 A | 3/1984 | Branchick et al. ........... 204/149 |
| 4,439,293 A | 3/1984 | Vaughan ...................... 204/180 |
| 5,006,216 A | 4/1991 | Dietrich et al. .............. 204/257 |
| 5,264,097 A | 11/1993 | Vaughan .................... 204/182.4 |
| 5,354,458 A | 10/1994 | Wang et al. ................. 210/180 |
| 5,466,352 A | 11/1995 | Brüken et al. ............ 204/182.4 |
| 5,472,585 A | 12/1995 | Dinella et al. ............ 204/182.4 |
| 5,599,437 A | 2/1997 | Taylor et al. ................ 205/744 |
| 5,770,090 A | 6/1998 | Lewis, III .................... 210/662 |
| 5,776,340 A | 7/1998 | Jangbarwala et al. ........ 210/274 |
| 5,876,579 A | 3/1999 | Gorzynski ................... 204/523 |
| 5,883,762 A | 3/1999 | Calhoun et al. ............. 360/113 |
| 6,162,361 A | 12/2000 | Adiga ......................... 210/652 |
| 6,270,647 B1 | 8/2001 | Graham et al. ................ 205/99 |

FOREIGN PATENT DOCUMENTS

JP        04-193977        * 7/1992

* cited by examiner

*Primary Examiner*—Arun S. Phasge
(74) *Attorney, Agent, or Firm*—Moser, Patterson & Sheridan

(57) ABSTRACT

The present invention generally provides an apparatus and method for removing contaminants from a plating solution. The apparatus generally includes a plating cell having an electrolyte inlet and an electrolyte drain, an electrolyte storage unit in fluid communication with the electrolyte inlet, and an electrodialysis chamber in fluid communication with the electrolyte drain, wherein the electrodialysis chamber is generally configured to receive a portion of used electrolyte solution and remove contaminants therefrom. The method generally includes supplying an electrolyte solution to a copper plating cell, plating copper onto a substrate in the plating cell with the electrolyte solution, removing used electrolyte solution from the plating cell, and refreshing a portion of the used electrolyte solution with an electrodialysis cell.

52 Claims, 4 Drawing Sheets

APPARATUS AND METHOD FOR REMOVING CONTAMINANTS FROM SEMICONDUCTOR COPPER ELECTROPLATING BATHS

BACKGROUND OF THE INVENTION

1. Field of the Invention

The present invention generally relates to removing organic contaminants from semiconductor electrolyte solutions.

2. Description of the Related Art

Metallization for sub-quarter micron sized features is a foundational technology for present and future generations of integrated circuit manufacturing processes. More particularly, in devices such as ultra large scale integration-type devices, i.e., devices having integrated circuits with more than a million logic gates, the multilevel interconnects that lie at the heart of these devices are generally formed by filling high aspect ratio interconnect features with a conductive material, such as copper or aluminum. Conventionally, deposition techniques such as chemical vapor deposition (CVD) and physical vapor deposition (PVD) have been used to fill these interconnect features. However, as interconnect sizes decrease and aspect ratios increase, void-free interconnect feature fill via conventional metallization techniques becomes increasingly difficult. As a result thereof, plating techniques, such as electrochemical plating (ECP) and electroless plating, for example, have emerged as viable processes for filling sub-quarter micron sized high aspect ratio interconnect features in integrated circuit manufacturing processes.

In an ECP process sub-quarter micron sized high aspect ratio features formed on a substrate surface may be efficiently filled with a conductive material, such as copper, for example. ECP plating processes are generally two stage processes, wherein a seed layer is first formed over the surface features of the substrate, and then the surface features of the substrate are exposed to an electrolyte solution, while an electrical bias is simultaneously applied between the substrate and an anode positioned within the electrolyte solution. The electrolyte solution is generally rich in ions to be plated onto the surface of the substrate, and therefore, the application of the electrical bias causes these ions to be urged out of the electrolyte solution and to be plated as a metal on the seed layer. The plated metal, which may be copper, for example, grows in thickness and forms a copper layer over the seed layer that operates to fill the features formed on the substrate surface.

In order to facilitate and control this plating process, several additives may be utilized in the electrolyte plating solution. For example, a typical electrolyte solution used for copper electroplating may consist of copper sulfate solution, which provides the copper to be plated, having sulfuric acid and copper chloride added thereto. The sulfuric acid may generally operate to modify the acidity and conductivity of the solution. The electrolytic solutions also generally contain various organic molecules, which may be accelerators, suppressors, levelers, brighteners, etc. These organic molecules are generally added to the plating solution in order to facilitate void-free super-fill of high aspect ratio features and planarized copper deposition. Accelerators, for example, may be sulfide-based molecules that locally accelerate electrical current at a given voltage where they absorb. Suppressors may be polymers of polyethylene glycol, mixtures of ethylene oxides and propylene oxides, or block copolymers of ethylene oxides and propylene oxides, for example, which tend to reduce electrical current at the sites where they absorb (the upper edges/corners of high aspect ratio features), and therefore, slow the plating process at those locations, which reduces premature closure of the feature before the feature is completely filled. Levelers, for example, may be nitrogen containing long chain polymers, which operate to facilitate planar plating. Additionally, the plating bath usually contains a small amount of chloride, generally between about 20 and about 60 ppm, which provides negative ions needed for adsorption of suppressor molecules on the cathode, while also facilitating proper anode corrosion.

Although the various organic additives facilitate the plating process and offer a control element over the interconnect formation processes, they also present a challenge, as the additives are known to eventually break down and become contaminate material in the electrolyte solution. Conventional plating apparatuses have traditionally dealt with these organic contaminants via bleed and feed methods (periodically replacing a portion of the electrolyte), extraction methods (filtering the electrolyte with a charcoal filter), photochemical decomposition methods (using UV in conjunction with ion exchange and acid-resistant filters), and/or ozone treatments (dispensing ozone into the electrolyte). However, these conventional methods are known to be inefficient, expensive to implement and operate, bulky, and/or to generate hazardous materials or other kinds of contaminants as byproducts. Therefore, there is a need for a method and apparatus for removing contaminants from semiconductor electroplating baths, wherein the method and apparatus addresses the deficiencies of conventional devices.

SUMMARY OF THE INVENTION

Embodiments of the invention generally provide a plating cell having an electrolyte inlet and an electrolyte drain, an electrolyte storage unit in fluid communication with the electrolyte inlet, and an electrodialysis chamber in fluid communication with the electrolyte drain, wherein the electrodialysis chamber is generally configured to receive a portion of used electrolyte solution and remove contaminants therefrom.

Embodiments of the invention further provide a method for plating copper, wherein the method generally includes supplying an electrolyte solution to a copper plating cell and plating copper onto a substrate in the plating cell with the electrolyte solution. The method further includes removing used electrolyte solution from the plating cell, and refreshing a portion of the used electrolyte solution with an electrodialysis cell.

Embodiments of the invention further provide a method for replenishing a copper plating solution. The method includes receiving a portion of a used copper plating solution in a first end of a depletion chamber or dilute cell of an electrodialysis cell, and urging positively charged copper and H+ ions into a concentration chamber or brine cell, while also urging negatively charged sulfate ions into the concentration chamber. The method further includes generating concentrated copper sulfate/sulfuric acid solution in the concentration chamber, and returning the concentrated copper sulfate/sulfuric acid solution to the copper plating solution.

BRIEF DESCRIPTION OF THE DRAWINGS

So that the manner in which the above recited features of the present invention are attained and can be understood in detail, a more particular description of the invention, briefly summarized above, may be had by reference to the embodiments thereof, which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
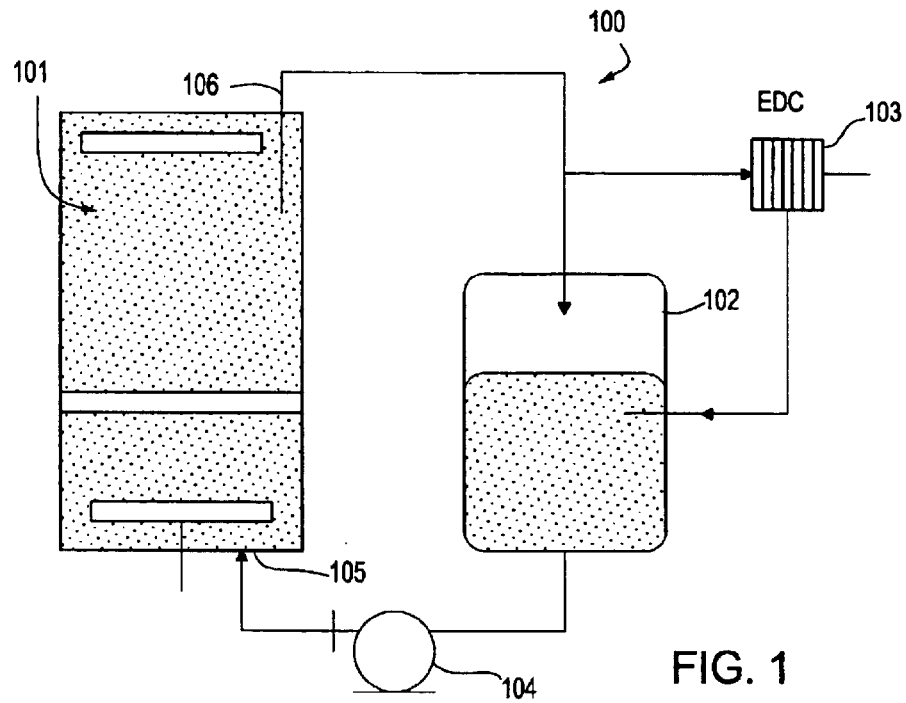
FIG. 1 illustrates an exemplary plating system incorporating an EDC cell of the invention.

FIG. 1 illustrates an exemplary plating system 100 of the present intention. Plating system 100 generally includes a plating cell 101, which may be electrochemical plating (ECP) cell, an electroless plating cell, or other plating cell configuration known in the semiconductor art. The plating cell 101 generally includes a fluid inlet 105 configured to deliver a plating processing fluid to the plating cell 101, and a fluid outlet or drain 106 configured to retrieve plating processing fluids from plating cell 101. The plating processing fluids are delivered to plating cell 101 via inlet 105, which is in fluid communication with a plating fluid storage unit 102. A fluid pump 104 is generally positioned between the fluid storage unit 102 and the plating cell 101 and is configured to deliver the plating fluid to plating cell 101 upon actuation thereof. The fluid outlet 106 of plating cell 101 is also in fluid communication with the fluid storage unit 102, and therefore, the fluid outlet may operate to return used processing fluids to the fluid storage unit 102. However, the fluid conduit connecting fluid drain 106 to fluid storage unit 102 may include a diverter or slipstream fluid conduit attached thereto, wherein the diverter or slipstream fluid conduit is configured to receive a portion of the processing fluid being returned from the processing cell 101 to the fluid storage unit 102 via drain 106. The slipstream fluid conduit may be in fluid communication with an input of an electrodialysis cell (EDC) 103, which may have an output thereof that is in fluid communication with the fluid storage unit 102.

Generally, EDC 103 is configured to receive a portion of the used processing fluid being returned from plating cell 101 to fluid storage unit 102. The received portion of used processing fluid is separated within EDC 103 into a usable fluid portion and a discardable fluid portion, wherein the usable fluid portion may then be reintroduced into the fluid storage unit 102 for subsequent use in plating operations. The usable portion of the plating solution may generally include one or more concentrated salts and acids that were originally present in the plating solution and that are generally free of contaminants resulting from organic additive breakdown in the plating solution. The discardable portion of the plating solution, which generally represents one or more dilute acids in conjunction with plating solution additives, contaminants and traces of copper, is separately output from EDC 103 and captured for disposal or neutralization thereof without returning to the fluid storage unit 102.

In a typical plating implementation, for example, storage unit 102 may hold approximately 200 liters of plating solution, and during operational periods, the plating cell 101 may generally receive and/or circulate therethrough approximately 100 liters of plating solution per hour. Therefore, in this type of configuration EDC 103 may be configured to receive approximately 1–2 liters per hour of used electrolyte solution from plating cell 101. The 1–2 liters per hour received by EDC 103 may then be separated into concentrated copper sulfate and sulfuric acid, which may be returned to storage unit 102 for use in subsequent plating operations, and diluted copper sulfate, sulfuric acid, and additives/contaminants, which may be removed from system 100 for neutralization or disposal thereof. As such, EDC 103 may continually be supplying fresh electrolyte solution to storage unit 102, which operates to decrease the frequency of replacement of the entire electrolyte solution and storage unit 102. Additionally, various configurations of EDC 103 may be implemented, such that larger or smaller volumes of used electrolyte may be circulated therethrough. Although the exemplary EDC illustrated in FIG. 1 receives only 1–2 liters per hour, it is contemplated that various configurations of EDCs may be implemented, which may receive upwards of 20–40 liters per hour. Further still, the present invention contemplates that EDC may be manufactured that is capable of receiving the entire used electrolyte stream, and therefore, the EDC may operate to filter/replenish the entire used electrolyte stream coming from a plating system.

Figure 2:
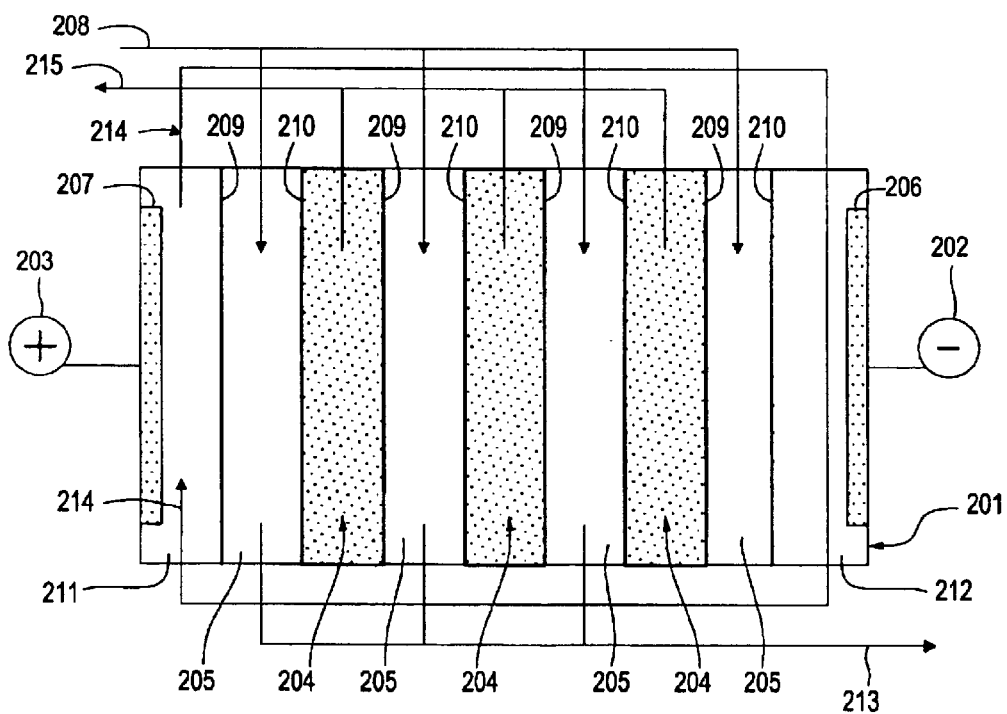
FIG. 2 illustrates a schematic view of an exemplary EDC cell of the invention.

FIG. 2 illustrates a schematic view of an exemplary EDC cell 103 of the present invention. The exemplary EDC cell 103, for example, may be implemented into an ECP system configured to plate copper onto semiconductor substrates. The exemplary EDC cell 103 generally includes an outer housing 201 configured to hold or confine the essential elements of EDC 103. A first end of housing 201 generally includes an anode source 203, while a second end of housing 201 generally includes a cathode source 202. Anode source 203 and cathode source 202 are generally positioned on opposite/opposing ends of housing 201. The volume between cathode source 202 and anode source 203 within housing 201 generally includes a plurality of EDC chambers, wherein the EDC chambers generally include alternating concentration chambers 204 and electrolyte depleting chambers 205. For example, as illustrated in FIG. 2, an alternating series of depleting chambers 205 and concentration chambers 204 are positioned between the anode source 203 and the cathode source 202 within housing 201. Additionally, the first and second ends of cell 203 may include an anode chamber 211 and a cathode chamber 212 corresponding to the anode 207 or cathode 206 positioned in the respective end of housing 201, wherein these chambers separate the respective anode and cathode from the depletion 205 and concentration 204 chambers. The respective chambers 204, 205 are individually separated by selectively permeable membranes 209, 210.

These membranes may be one of many commercially available membranes. For example, Tokuyama Corporation manufactures and supplies various hydrocarbon membranes for electrodialysis and related applications under the trade name "Neosepta." Perfluorinated cation membranes, which are stable to oxidation and useful when it is necessary to separate anode compartment by a cation membrane, are generally available from DuPont Co as Nafion membranes N-117, N-450, or from Asahi Glass Company (Japan) under the trade name Flemion as Fx-50, F738, and F893 model membranes. Asahi Glass Company also produces a wide range of polystyrene based ion-exchange membranes under the trade name Selemion, which can be very effective for concentration/desalination of electrolytes and organic removal (cation membranes CMV, CMD, and CMT and anion membranes AMV, AMT, and AMD). There are also companies that manufacture similar ion-exchange membranes (Solvay (France), Sybron Chemical Inc. (USA), Ionics (USA), and FuMA-Tech (Germany) etc.). Further, in order to minimize the penetration of copper ions into cathode compartment, it may be helpful to separate this compartment by a bipolar ion-exchange membrane that is made from cation and anion membranes compiled together. Bipolar membranes, such as models AQ-BA-06 and AQ-BA-04, for example, are commercially available from Aqualitics (USA) and Asahi Glass Co.

The respective chambers 204,205 are individually separated by anionic membranes 209 and cationic membranes 210. The particular configuration of anionic membranes 209 and cationic membranes 210 illustrated in FIG. 2 operates to generate alternating concentration chambers 204 and depleting chambers 205. Although four depletion chambers 205 and three concentration chambers 204 are illustrated in the embodiment of FIG. 2, the present invention contemplates generally any number of concentration and depletion chambers may be used. For example, embodiments of the invention contemplate that the total number of concentration chambers may be between about 5 and about 500, for example. Additionally, EDC 103 includes a cathode chamber 212 and an anode chamber 211 positioned immediate the respective cathode 206 and anode electrodes 207. Cathode and anode chambers 212 and 211 may be supplied with a sulfuric acid solution via conduit 214, which may operate to circulate the acid solution through the respective chambers.

In operation, used electrolyte from a plating system is delivered to depletion chambers 205 via conduit 208, while an electrical bias is applied across EDC cell 103 via anode 207 and cathode 206. The electrical bias generated by anode 207 and cathode 206 urges positive copper ions and hydrogen ions in the used electrolyte solution towards the cathode 206 while simultaneously urging negatively charged sulfate ions in the used electrolyte solution towards the anode 207. Further, the configuration of anionic membranes 209 and cationic membranes 210 operate to capture the positive copper and H+ ions and the negative sulfate ions in the concentration chambers 204, where these ions may combine to form copper sulfate and sulfuric acid. The formed acidic copper sulfate solution may then be removed from concentration chambers 204 via fluid outlet 215 and be re-circulated into the plating system (or an electrolyte solution tank, etc.), as $CuSO_4/H_2SO_4$ are primary elements of an electrolyte solution for a copper electroplating system. Further, the configuration of anionic membranes 209 and cationic membranes 210 operates to confine the contaminants in the used electrolyte solution deposited into depletion chambers 205 therein. As such, the contaminants that are confined within depletion chambers 205, which generally comprise depleted and decomposed organics, small solid particles and traces of acid and copper, may be removed therefrom via fluid outlet 213 and disposed of or neutralized, as desired. Therefore, EDC 103 generally operates to receive used electrolyte from a plating system and separate viable components (copper sulfate and sulfuric acid) from the used electrolyte for reuse in the plating system.

Figure 3:
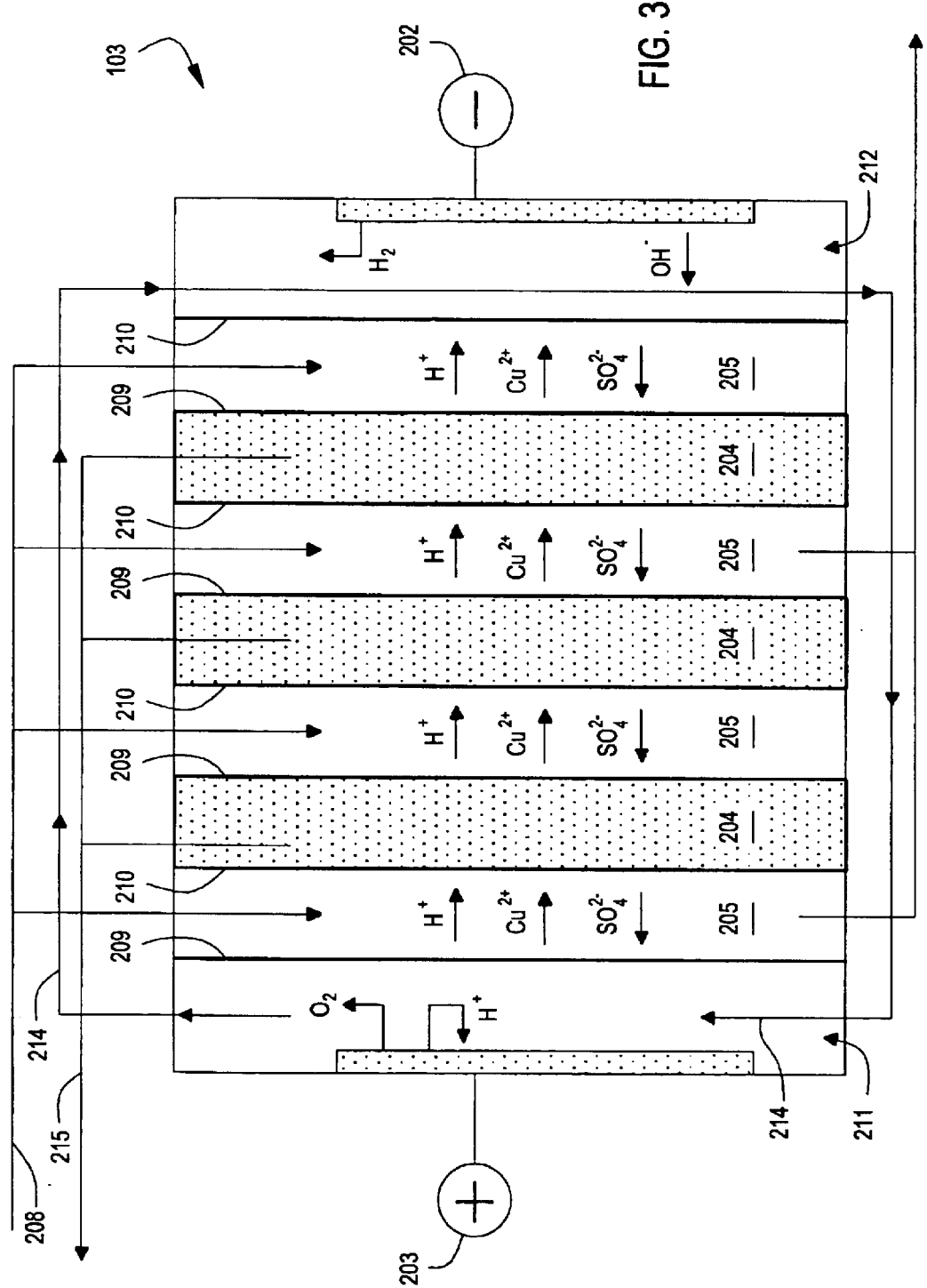
FIG. 3 illustrates a detailed schematic view of an exemplary EDC cell of the invention.

FIG. 3 shows a more detailed illustration of the operation of EDC cell 103. In this embodiment, aged electrolyte is supplied to EDC cell 103 via conduit 208, which may include communication with an electrolyte drain of an ECP cell. Conduit 208 supplies the aged electrolyte into a plurality of depletion cells or chambers 205 in the EDC cell 103. While the aged electrolyte is being supplied to the depletion cells 205, an electrical bias is applied across EDC cell 103 via cathode 206 and anode 207. In the illustrated EDC cell 103 configuration, the electrical bias supplied thereto may be about 7 volts, for example, however, the electrical bias may be increased or decreased in order to adjust the process parameters. However, generally, the bias applied across the EDC cell 103 for the purpose of extracting contaminants from a plating solution made generally be calculated as a ballot one volt of electrical bias for each cell/chamber within EDC cell 103. Therefore, inasmuch as there are 7 cells/chambers within EDC cell 103 (3 concentration chambers and 4 depletion chambers), the electrical bias supplied between cathode 206 and anode 207 may be approximately 7 volts.

The application of the electrical bias across EDC cell 103 operates to urge ions in the aged electrolyte solution towards the respective poles, i.e., positive ions will be urged in the direction of the cathode, while negative ions will be urged in the direction of the anode. Therefore, the disassociated copper ions in the aged electrolyte solution, which are generally illustrated as $Cu^{2+}$ in FIG. 3, along with positive hydrogen ions ($H^+$), are urged in the direction of cathode 206. Similarly, disassociated sulfate ions in the aged electrolyte solution, which are generally illustrated as $SO_4^{2-}$, are urged in the direction of anode 207. However, although the respective ions are urged in the direction of the respective poles, the linear distance the respective ions are allowed to travel is limited by the positioning of the anionic and cationic membranes 209,210. More particularly, the positive copper and hydrogen ions in depletion cells 205 are urged towards cathode 206, and are allowed to pass into the neighboring concentration chamber 204, as the membranes separating deletion chamber 205 and concentration chamber 204 is a cationic membrane 210, which may generally be configured to transmit the respective positive ions therethrough in the direction of the cathode 206. Similarly, the negatively charged sulfate ions are urged towards the anode 207 and are allowed to pass into the neighboring concentration chamber 204 by an anionic membrane 209, which made generally be configured to transmit negative ions therethrough in the direction of the anode 207. As a result of the alternating positioning of the cationic and anionic membranes 210,209, positive copper ions and negative sulfate ions are allowed to diffuse into concentration chambers 204, where these ions may combine to form concentrated copper sulfate-sulfuric acid solution ($CuSO_4/H_2SO_4$). This concentrated copper sulfate may then be removed from concentration chambers 204 via outlet 215 and returned to the plating system, as concentrated acidic copper sulfate solutions all are a common component in copper ECP baths.

The hydrogen ions behave similarly to Cu ions, in that when the hydrogen ions enter concentration chambers 204 they form $H_2SO_4$ upon combining with the with $SO4^{2-}$ ions. Thus, in embodiments of the invention, a goal is to transfer $CuSO_4$ and $H_2SO_4$ from the depletion chambers 205 to concentration chambers 204, while the solution contaminants (organic contaminants, impurities, breakdown chains, solid particles, etc.) remain in depletion chambers 205. The difficulty in this process is generally maintaining a $CuSO_4/H_2SO_4$ solution in the concentration chambers 204, where the concentration of Cu and acid is at least the same as an initial contaminated solution (or in the plating bath). This process is difficult, as the H+ ions migrate and diffuse through the membranes approximately 100 times faster than the Cu ions. Additionally, anionic membranes are generally partially permeable for the H+ ions as they migrate towards the cathode, which is generally termed "back migration" or "high diffusivity of H+" effect. To decrease the negative influence of H+ ions, embodiments of the present invention utilize anionic membranes having a dense population of canals. The size of canals is generally between about 1 and about 10 nm. For example, Neosepta membranes, ACS membranes, and AM3 membranes have these properties. Additionally, the selectivity of anion membranes increases (or H+ back migration decreases) in diluted solutions. Therefore, in order to improve the anionic membrane transport properties and to prevent penetration of H+ through anionic membrane, the present invention implements intermediate chambers with diluted $H_2SO_4$ between depletion and concentrate chambers.

The remaining portions of the aged electrolyte solution that are not urged through the respective membranes via the electrical bias applied to EDC 103 may fall or generally pass through depletion chambers 205 and may be captured on the bottom side of EDC 103. Therefore, assuming EDC 103 is implemented in conjunction with a copper ECP system, then the output of EDC 103 (the output of depletion chambers 205) will generally include diluted copper sulfate, traces of sulfuric acid ($H_2SO_4$), and waste or contamination materials, which generally correspond to spend or depleted organics additives dispensed into the electrolyte solution for the purpose of controlling plating characteristics.

The outermost chambers of EDC 103, i.e., the cathode chamber 212 and the anode chamber 211, generally operate to isolate the interior chambers of EDC 103, i.e., the depletion and concentration chambers 205,204, from the cathode 206 and anode 207. Generally, a sulfuric acid solution may be flowed between the respective chambers 211,212, which operates to both maintain the respective electrodes (cathode and anode) clean, while also absorbing ions that may diffuse into the cathode chamber 212 and anode chamber 211. For example, the first membrane proximate the cathode is an anionic membrane 209, and therefore, when the electrical bias is applied to EDC 103, positive copper ions will not migrate from the adjacent concentration chamber through membrane 210 into the cathode chamber 212, so that copper will not deposit on the cathode 206. At the same time $SO_4^{2-}$ ions will be carried away from the sulfuric acid solution into $CuSO_4/H_2SO_4$ concentrate. Similarly, the membrane positioned closest to the anode is an anionic membrane 209, and therefore, negative sulfate ions in the adjacent chamber will be urged to diffuse into the anode chamber 211 when the electrical bias is applied, compensating the loss of $SO_4^{2-}$ taking place in the cathode chamber. Once these negative ions diffuse into the anode chamber 211, they may be absorbed or slipped away by the sulfuric acid solution being flowed therethrough.

In another embodiment of the invention, EDC 103 may include a plurality of alternating depletion chambers 205 and concentration chambers 204. For example, there may be up to about 500 alternating depletion chambers 205 and concentration chambers 204, thus totaling up to 1000 total chambers. However, most copper plating configurations using an EDC will generally require from 5 to about 50 chambers. The respective chambers may be positioned to immediate each other, i.e., each depletion chamber 205 may essentially be in contact with each neighboring concentration chamber 204. As such, the respective anionic membranes 209 and cationic membranes 210 may effectively touch each other when a large number of chambers are implemented. In configurations where the concentration chambers 204 and the depletion chambers 205 are densely spaced, a neutral mesh may be positioned between the respective membranes in order to provide a spacer and to maintain the respective cationic and anionic membranes isolated from each other, while still allowing both positive and negative ions to flow therethrough.

Figure 4:
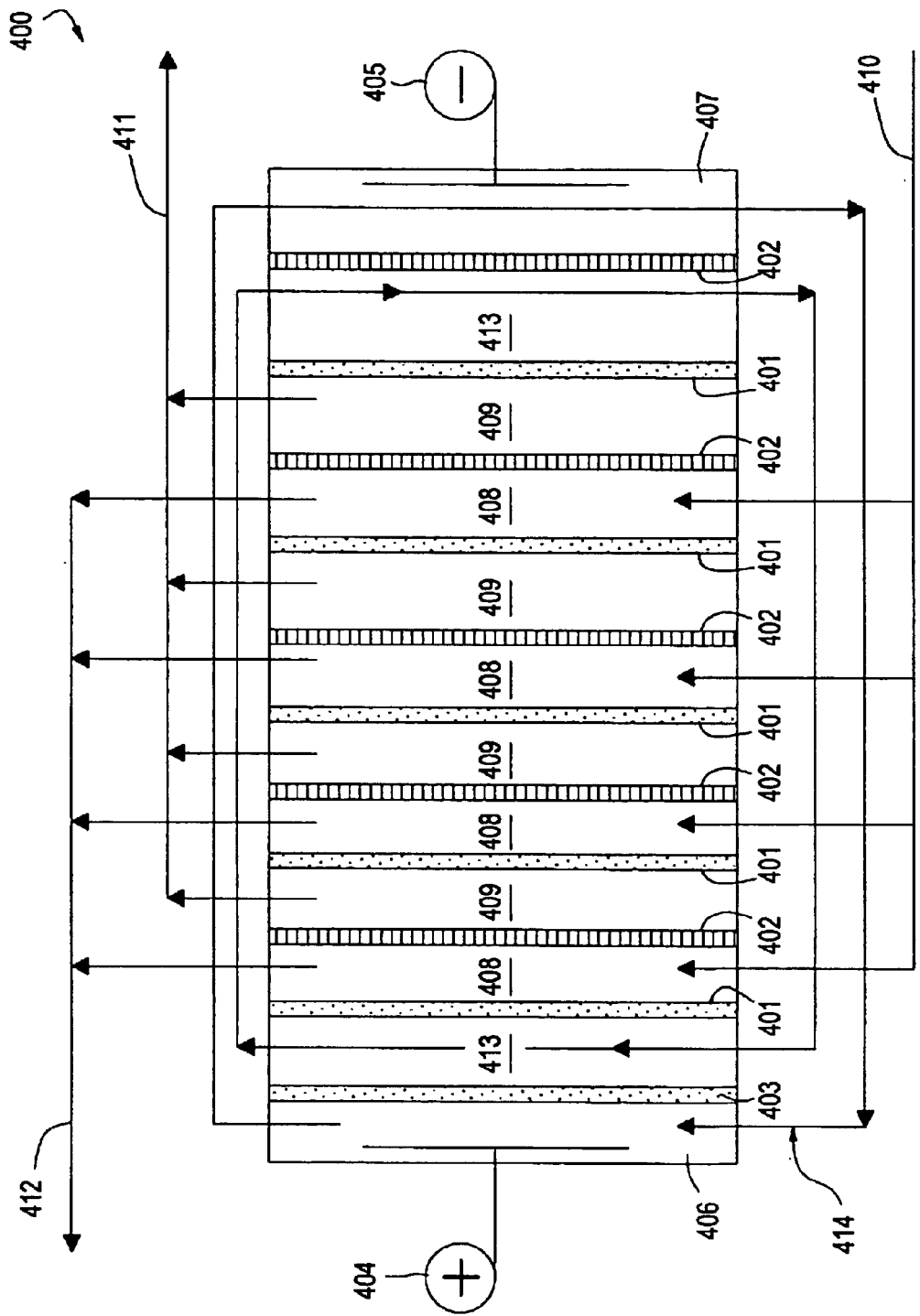
FIG. 4 illustrates a schematic view of an alternative embodiment of an EDC cell of the invention.

FIG. 4 illustrates another embodiment of an exemplary EDC 400 of the invention. EDC 400 is similarly constructed to EDC 103, in that EDC 400 includes a plurality of alternating anionic membranes 401 and cationic membranes 402 that cooperatively form alternating depletion chambers 408 and concentration chambers 409. In similar fashion to EDC 103, an inlet 410 is used to communicate used or spent electrolyte from a plating cell, such as a copper ECP cell, into the depletion chambers 408 of EDC 400. Immediately outward of the alternating sequence of depletion chambers 408 and concentration chambers 409 are individual isolation chambers 413. Isolation chambers 413 generally include a fluid inlet and a fluid outlet configured to receive and expel a circulating fluid, which may be a diluted sulfuric acid solution. In this configuration, the diluted sulfuric acid solution may be circulated between the respective isolation chambers 413 positioned on each side of EDC 400. Positioned outward of isolation chambers 413 are respective anode chamber 406 and cathode chamber 407. The anode chamber 406 and cathode chamber 407 are structurally similar to isolation chambers 413, in that both anode chamber 406 and cathode chamber 407 include a fluid inlet and a fluid outlet configured to circulate a fluid solution between the respective anode and cathode chambers 406,407. However, EDC 400 is configured to circulate concentrated sulfuric acid between the respective anode chamber 406 and cathode chamber 407 via line 414.

The membrane structure of EDC 400 is similar to the membrane structure of EDC 103. However, EDC 400 includes a slight variation on the membrane configuration in order to accommodate the additional isolation chambers 413. More particularly, the membrane structure still generally follows an alternating sequence, i.e., from left to right, an anionic membrane, then a cationic membrane, then and anionic membrane, etc. However, the membrane closest to the anode is generally a cation exchange membrane 403, such as, for example, a NAFION cation exchange membrane. The membrane closest to cathode 405 may be an cationic membrane 402.

In operation, EDC 400 operates similarly to EDC 103 illustrated in FIG. 2, as the used electrolyte is supplied to depletion chambers 408 via conduit 410, while electrical bias is applied between cathode 405 and anode 404. The application of the electrical bias causes positively charged ions in the used electrolyte solution to migrate towards the cathode 405, while negatively charged ions are urged to migrate towards the anode 404. The configuration of cationic 402 and anionic 401 membranes operates to transport positive copper ions and negatively charged sulfate ions in concentration chambers between the respective membranes. The positive copper ions and the negative sulfate ions made combine to form renewed concentrated copper sulfate, which may then be extracted from EDC 400 for reuse in a copper plating system. The remaining portions of the used electrolyte solution flow through the depletion chambers 408 and may be extracted therefrom via conduit 412. The extracted solutions, which generally comprise diluted copper sulfate, sulfuric acid, in content material may be neutralized or disposed of. The isolation chambers 413 have a diluted sulfuric acid solution circulating between the two chambers, while the anionic chamber 406 and cationic chamber 407 have a concentrated sulfuric acid solution being circulated therethrough.

Under electrolysis oxygen and traces of chlorine are produced, as a small amount of $CuCl_2$ is generally present in a copper plating electrolyte. Both $O_2$ and $Cl_2$ are strong oxidizers and increase the destruction of regular ion-exchange membranes, while the perfluorized Nafion membrane remains stable even under chloride production from brines for many years. In this embodiment the Nafion cation exchange membrane 403 is used to increase the life-time of the membrane that separates the anode compartment from others. The insulating chamber adjacent to the cathode chamber 406 serves to re-concentrate the diluted sulfuric acid that was depleted in the insulating chamber disposed near the cathode chamber. The insulating chamber 413 near the cathode provides additional protection of the cathode compartment from Cu ions, as in diluted acids the selectivity of anion membranes becomes higher, so that the anion membrane (that separates the cathode from the insulating chamber) becomes essentially non-permeable for Cu ions. This is significant, as EDC 400 will not require cleaning and/or disassembly to remove copper deposition from the cathode as often as conventional devices.

Additionally, in similar fashion to EDC 103, EDC 400 and may include as few 3 or 4 chambers, and may include as many as 500 or more chambers, wherein chambers includes depletion chambers 408 and concentration chambers 409. Further still, the respective membranes in EDC 400 may also be configured to be very dense, i.e., several hundred membranes may be present in a 2 to 6 inch EDC housing. In the densely packed membrane configurations, EDC 400 may include an additional mesh that may be interstitially positioned between the respective anionic and cationic membranes. The additional mesh, which may be neutral with respect to its ionic polarity, may essentially be used to space the respective anionic membranes slightly away from the cationic membranes, as contact between the respective membranes may hinder or destroy the polarity thereof. However, it is to be noted that the mesh separators are generally penetrable in either direction to both positive and negative ions, and therefore, will have little or no effect upon the ionic diffusion or flow within EDC 400.

Figure 5:
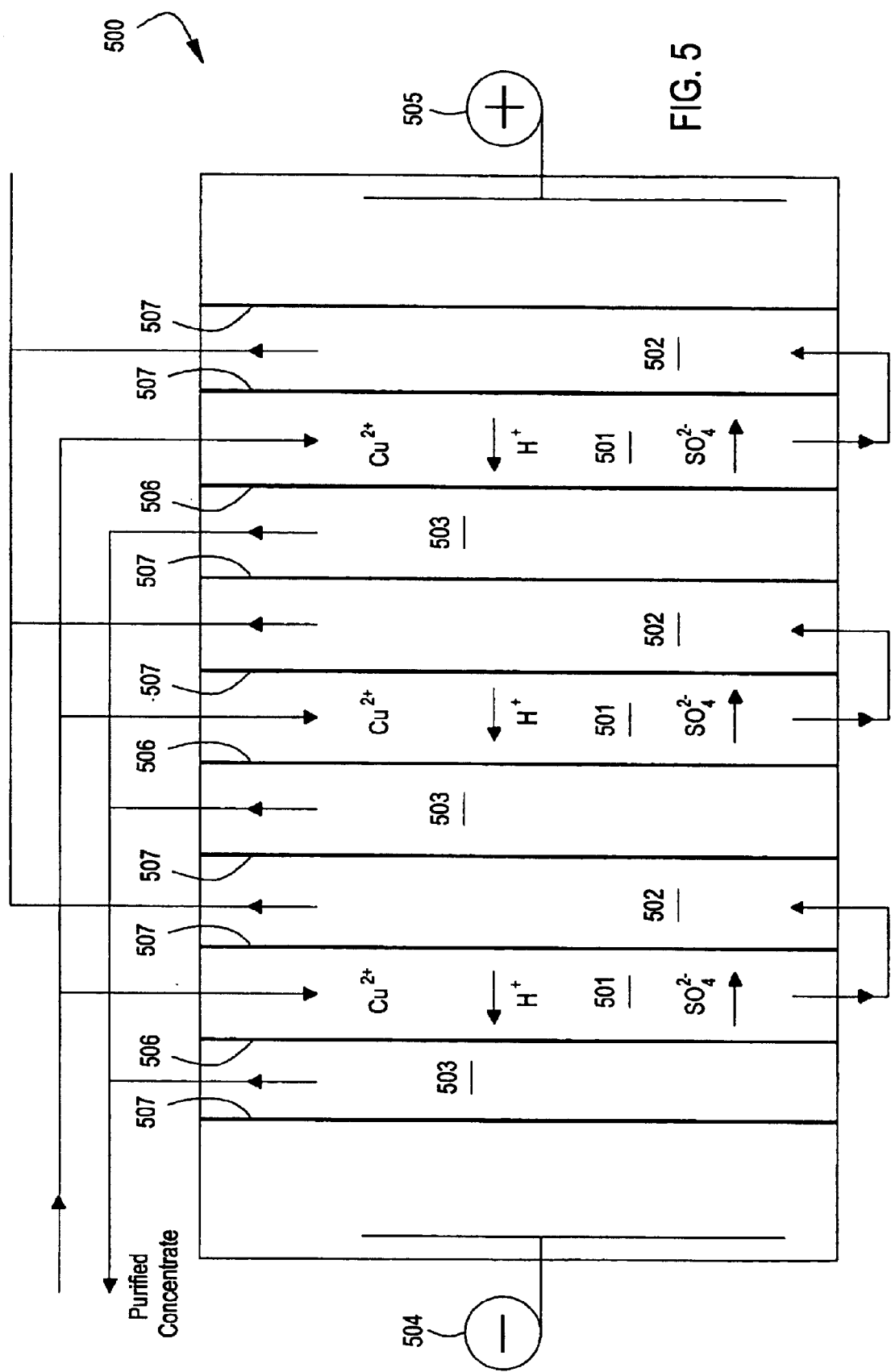
FIG. 5 illustrates a schematic view of another exemplary embodiment of an EDC cell of the invention.

FIG. 5 illustrates another embodiment of an exemplary EDC 500 of the invention. EDC 500 is similar in structure to EDC 400 and EDC 103 discussed above, however, EDC 500 includes a different configuration of anionic and cationic membranes. More particularly, EDC 500 generally alternates between anionic and cationic membranes with an additional anionic membrane disposed between every other cationic membrane. As illustrated in FIG. 5, EDC 500 generally includes a chamber housing having a cathode 504 positioned on a first end and anode 505 positioned on a second end. A plurality of chambers are positioned between the respective cathode 504 and anode 505.

The plurality of chambers include depletion chambers 501 configured to receive waste electrolyte therein, low concentration chambers 502 configured to receive the output of depletion chambers 501 or (in other embodiment) fed by diluted sulfuric acid, and high concentration chambers 503 configured to dispense purified electrolyte solution consisting of concentrated salts and acids. Depletion chambers 501 are generally bound or defined by a cationic membrane 506 on the side of depletion chambers 501 that are nearest to the cathode 504. The opposing side of depletion chambers 501, which is generally the side of depletion chambers 501 that is closest to the anode 505, are generally bound or defined by an anionic membrane 507. Low concentration chambers 502 are generally defined or bound on both sides of the respective chambers with an anionic membrane 507. High concentration chambers 503 are generally bound on a first side positioned closest cathode 504 with an anionic membrane 507. The opposing or second side of high concentration chambers 503, which is the side closest to the anode, is generally bound or defined by a cationic membrane 506. Traditionally, EDC 500 may also include the intermediate chambers positioned approximately respective cathode 504 and anode 505 for the purpose of isolating the respective electrodes from copper deposition thereon.

In operation, and EDC 500 may receive waste electrolyte, which generally includes positive copper and hydrogen ions, negative sulfate ions, and variously charged contaminated ions, in depletion chambers 501. The waste electrolyte flows through the depletion chambers 501, as indicated by the arrows illustrated in FIG. 5. As the waste electrolyte flows through depletion chambers 501, the respective positive and negative ions are drawn toward the cathode and anode according to their polarity, as described in previous embodiments. Therefore, as a result of the electrical potential applied across EDC 500 by the cathode 504 and anode 505, the output of depletion chambers 501 generally consists of primarily a diluted acid solution and traces of copper ions. The diluted acid solution is then returned to low concentration chambers 502 of EDC 500. The diluted acid solution travels through low concentration chambers 502 and is further separated by the electrical potential applied thereto, and therefore, the output of low concentration chambers 502 generally consists of a diluted solution containing positive copper ions, positive hydrogen ions and negative sulfate ions. High concentration chambers 503 does not received a fluid inlet in a similar manner to depletion chambers 501 and low concentration chambers 502, however, high concentration chambers 503 have an output configured to dispense purified electrolyte solution in a concentrated form. The concentrated output of high concentration chambers 503 results from the diffusion of ions through the adjoining membranes into high concentration chambers 503, wherein the ions defusing therein combine to form a concentrated copper sulfate solution and a concentrated sulfuric acid solution.

In this embodiment, the presence of additional low concentration chambers fed by exhausted waste electrolyte has at least two advantages over conventional devices. First, embodiments of the invention decrease the back migration and diffusion of acid through membranes, as selectivity of membranes (a good anion membrane transports only anions, a bad one—60% of anions and 40% -cations) increases when the membrane contacts with diluted solution. Therefore, so the low concentration chambers improve the efficiency of electrodialysis (amount of concentrate obtained) and increase the concentration of copper in concentrate chambers. Another advantage provided by embodiments of the present invention is that diluted sulfuric acid can be used to feed low concentration chambers as well, but cost of consumables decreases if one replaces the pure acid solution by exhausted waste electrolyte.

While the foregoing is directed to embodiments of the present invention, other and further embodiments of the invention may be devised without departing from the basic scope thereof, and the scope thereof is determined by the claims that follow.

What is claimed is:

1. A copper electrochemical plating system, comprising:
   a plating cell having an electrolyte inlet and an electrolyte drain;

an electrolyte storage unit in fluid communication with the electrolyte inlet; and an electrodialysis chamber in fluid communication with the plating cell, the electrodialysis chamber being configured to receive a portion of electrolyte solution and remove contaminants therefrom, the electrodialysis chamber comprising:

a housing having a cathode electrode positioned in a first end and an anode electrode positioned in a second end;

at least one depletion chamber positioned between the cathode electrode and the anode electode; and at least one concentration chamber positioned between the cathode electrode and the anode electrode.

2. The copper electrochemical plating system of claim 1, wherein the at least one concentration chamber comprises at least one high concentration chamber positioned between the cathode electrode and the anode electrode.

3. The copper electrochemical plating system of claim 2, wherein the at least one depletion chamber comprises:

a fluid inlet configured to receive used electrolyte;

an anionic membrane defining a first side of the depletion chamber;

a cationic membrane defining a second side of the depletion chamber, the second side being positioned opposite the first side; and a depletion chamber fluid outlet configured to dispense waste electrolyte and contaminants therefrom.

4. The copper electrochemical plating system of claim 3, wherein the first side is positioned closer to the anode electrode than the cathode electrode and wherein the second side is positioned closer to the cathode electrode than the anode electrode.

5. The copper electrochemical plating system of claim 2, wherein the at least one high concentration chamber comprises:

an anionic membrane positioned on a cathode side of the high concentration chamber;

a cationic membrane positioned on the anode side of the high concentration chamber; and a high concentration chamber fluid outlet configured to dispense restored electrolyte therefrom.

6. The copper electrochemical plating system of claim 2, wherein the at least one high concentration chamber is separated from the at least one depletion chamber by at least one of a cationic membrane and an anionic membrane.

7. The copper electrochemical plating system of claim 6, wherein the anionic membrane comprises a membrane having selectivity towards positively charged ions.

8. The copper electrochemical plating system of claim 6, wherein the anionic membrane is configured to allow negatively charged ions to pass therethrough in the direction of the anode.

9. The copper electrochemical plating system of claim 6, wherein the anionic membrane is configured to prevent positively charged ions from passing therethrough in the direction of the anode.

10. The copper electrochemical plating system of claim 6, wherein the cationic membrane is configured to allow positively charged ions to pass therethrough in the direction of the cathode.

11. The copper electrochemical plating system of claim 6, wherein the cationic membrane is configured to prevent negatively charged ions from passing therethrough in the direction of the cathode.

12. The copper electrochemical plating system of claim 2, further comprising:

an anode chamber positioned adjacent the anode electrode; and a cathode chamber positioned adjacent the cathode electrode.

13. The copper electrochemical plating system of claim 12, wherein the anode chamber and the cathode chamber are configured to isolate the anode electrode and the cathode electrode from the at least one depletion chamber and the at least one high concentration chamber.

14. The copper electrochemical plating system of claim 12, wherein the anode chamber is in fluid communication with the cathode chamber.

15. The copper electrochemical plating system of claim 2, further comprising at least one low concentration chamber positioned between the at least one high concentration chamber and the at least one depletion chamber.

16. The copper electrochemical plating system of claim 15, wherein the at least one low concentration chamber is configured to receive electrolyte from the at least one depletion chamber and output a diluted acid solution therefrom.

17. The copper electrochemical plating system of claim 1, further comprising a depletion chamber inlet.

18. The copper electrochemical plating system of claim 17, further comprising a concentration chamber outlet.

19. The copper electrochemical plating system of claim 1, further comprising a depletion chamber outlet.

20. A copper plating system, comprising:

a plating cell having a cathode substrate support member and an electrolyte solution bath having an anode disposed therein;

an electrolyte storage tank configured to supply electrolyte to the electrolyte solution bath and receive used electrolyte from the plating cell via an electrolyte drain; and an electrodialysis cell in fluid communication with the electrolyte drain, the electrodialysis cell comprising:

a cathode electrode positioned in a first end of the electrodialysis cell and an anode electrode positioned opposite the cathode electrode in a second end of the electrodialysis cell; and a plurality of depletion chambers between the cathode electrode and the anode electrode and a plurality of concentration chambers between the cathode electrode and the anode electrode.

21. The copper plating system of claim 20 wherein the plurality of depletion chambers comprise:

an anionic membrane positioned on an anode side of the electrodialysis cell;

a cationic membrane positioned on a cathode side of the electrodialysis cell; and a fluid inlet configured to receive used electrolyte in a region between the anionic membrane and the cathodic membrane.

22. The copper plating system of claim 20, wherein the plurality of concentration chambers comprise:

an anionic membrane positioned on a cathode side of the electrodialysis cell;

a cationic membrane positioned on an anode side of the electrodialysis cell; and a fluid outlet configured to communicate concentrated acid solutions out of the concentration chambers.

23. The copper plating system of claim 20, wherein the electrodialysis cell further comprises:

a cathode chamber positioned proximate the cathode electrode and being separated from the plurality of depletion chambers and the plurality of concentration chambers by a cationic membrane; and an anode chamber positioned proximate the anode electrode and being separated from the plurality of depletion chambers and the plurality of concentration chambers by a anionic membrane.

24. The copper plating system of claim 23, wherein the cathode chamber and the anode chamber are in fluid communication and have an acid solution circulated therebetween.

25. The copper plating system of claim 20, wherein the electrodialysis cell further comprises at least one low concentration chamber positioned between one of the plurality of concentration chambers and one of the plurality of depletion chambers.

26. The copper plating system of claim 25, wherein the at least one low concentration chamber comprises:

a first anionic membrane positioned on an anode side of the low concentration chamber;

a second anionic membrane positioned on an anode side of the low concentration chamber;

a fluid inlet configured to receive a diluted acid solution from an output of one of the plurality of concentration chambers; and a fluid outlet configured to dispense a diluted acid solution therefrom.

27. The copper plating system of claim 20, wherein the plurality of concentration chambers and the plurality of depletion chambers are defined by anionic membranes and cationic membranes.

28. A method for plating copper, comprising:

supplying an electrolyte solution to a copper plating cell;

plating copper onto a semiconductor substrate in the plating cell with the electrolyte solution;

removing used electrolyte solution from the plating cell; and refreshing a portion of the used electrolyte solution with an electrodialysis cell.

29. The method of claim 28, wherein refreshing a portion of the used electrolyte with an electrodialysis cell comprises:

delivering the used electrolyte solution in a first end of a depletion chamber;

urging positive copper ions and positive hydrogen ions to diffuse through a cationic membrane towards a cathode into a concentration chamber of the electrodialysis cell;

urging negative sulfate ions to diffuse through an anionic membrane towards an anode into the concentration chamber; and removing a copper sulfate solution from the concentration chamber.

30. The method of claim 29, further comprising combining the positive copper ions and the negative sulfate ions together in the concentration chamber to form the copper sulfate solution.

31. The method of claim 29, wherein the urging positive copper ions and positive hydrogen ions and the urging negative sulfate ions comprise applying an electrical bias across the electrodialysis cell.

32. The method of claim 31, wherein a voltage of the electrical bias is approximately equal to a number of chambers in the electrodialysis cell.

33. The method of claim 29, further comprising circulating a sulfuric acid solution between a cathode chamber positioned proximate a cathode electrode and an anode chamber positioned proximate an anode electrode.

34. The method of claim 29, further comprising removing a dilute acid solution having electrolyte contaminants therein from a second end of the depletion chamber.

35. The method of claim 28, wherein removing used electrolyte solution from the plating cell comprises removing used electrolyte solution from a second end of the depletion chamber.

36. A method for replenishing a copper plating solution, comprising:

receiving a portion of a used copper plating solution in a first end of a depletion chamber of an electrodialysis cell;

urging positively charged copper ions into a concentration chamber of the electrodialysis cell;

urging negatively charged sulfate ions into the concentration chamber;

generating concentrated copper sulfate in the concentration chamber; and returning the concentrated copper sulfate to the copper plating solution.

37. The method of claim 36, further comprising circulating an acid solution between an anode chamber positioned immediate an anode electrode and a cathode chamber positioned immediate a cathode electrode.

38. The method of claim 36, further comprising removing a diluted acid solution and electrolyte contaminants from a second end of the depletion chamber.

39. The method of claim 38, wherein the diluted acid solution and electrolyte contaminants comprise about 5 to about 10 percent of a volume of used copper plating solution received in the first end of the depletion chamber.

40. The method of claim 36, wherein the returned concentrated copper sulfate solution comprises about 85 to about 95 percent of a total volume of the used copper plating solution supplied to the depletion chamber.

41. The method of claim 36, further comprising positioning a plurality the concentration chambers adjacent a plurality of the depletion chambers in an alternating manner, wherein the plurality of concentration chambers and the plurality of depletion chambers are separated by at least one of an anionic membrane and a cationic membrane.

42. The method of claim 41, wherein a total of the plurality of concentration chambers and the plurality of depletion chambers is between about 5 and about 500.

43. The method of claim 41, wherein a total of the plurality of concentration chambers and the plurality of depletion chambers is between about 25 and about 100.

44. The method of claim 36, further comprising applying an electrical bias across the depletion chamber.

45. The method of claim 44, wherein a voltage of the electrical bias is approximately equal to a total number of concentration chambers and depletion chambers in the electrodialysis cell.

46. The method of claim 36, wherein the receiving comprises receiving the used electrolyte solution in up to 500 depletion chambers within the electrodialysis cell.

47. The method of claim 36, wherein the concentration chamber is positioned adjacent the depletion chamber.

48. The method of claim 47, wherein the concentration chamber is separated from the depletion chamber on a first side by an anionic membrane and on a second side by a cationic membrane, wherein the first side is proximate a cathode electrode and the second side is proximate an anode electrodes.

49. A copper electrochemical plating system, comprising:

a plating cell having a substrate support member in electrical communication with a cathode source and an electrolyte solution bath having a anode source in electrical communication therewith;

an electrolyte storage tank configured to supply electrolyte to the electrolyte solution bath and receive used electrolyte from the plating cell via an electrolyte drain, the electrolyte solution bath having copper sulfate therein as a source of copper ions to be plated; and an electrodialysis cell in fluid communication with the plating cell, the electrodialysis cell comprising:
- a chamber having a cathode electrode positioned at a first end and an anode electrode positioned at a second end, the first end being oppositely positioned from the second end;
- at least one depletion chamber positioned between the cathode electrode and the anode electrode; and
- at least one concentration chamber positioned between the cathode electrode and the anode electrode.

50. The copper electrochemical plating system of claim 49, wherein the at least one depletion chamber adjoins the at least one concentration chamber.

51. The copper electrochemical plating system of claim 49, wherein the at least one depletion chamber and the at least one concentration chamber are separated by at least one of a cationic membrane and an anionic membrane.

52. The copper electrochemical plating system of claim 49, further comprising an isolation chamber positioned proximate the anode electrode and an isolation chamber positioned proximate the cathode electrode.

* * * * *

UNITED STATES PATENT AND TRADEMARK OFFICE
CERTIFICATE OF CORRECTION

PATENT NO. : 6,878,258 B2
APPLICATION NO. : 10/074569
DATED : April 12, 2005
INVENTOR(S) : Nicolay Kovarsky It is certified that error appears in the above-identified patent and that said Letters Patent is hereby corrected as shown below:

In the Specification

Column 3, Line 23: Change "intention" to --invention--

Column 6, Line 12: Change "made" to --may--

Column 6, Line 44: Change "made" to --may--

Column 6, Line 57: Change "$SO4^{2}$" to --$SO_4^2$--

Column 7, Line 17: Change "concentrate" to --concentration--

Column 8, Line 41: After "then", change "and" to --an--

Column 8, Line 45: Change "an" to --a--

Column 8, Line 58: Change "made" to --may--

Column 9, Line 26: Delete the first instance of "and"

Column 10, Line 13: Before "EDC", delete "and"

Column 10, Line 51: Delete "so"

UNITED STATES PATENT AND TRADEMARK OFFICE
CERTIFICATE OF CORRECTION

PATENT NO. : 6,878,258 B2
APPLICATION NO. : 10/074569
DATED : April 12, 2005
INVENTOR(S) : Nicolay Kovarsky It is certified that error appears in the above-identified patent and that said Letters Patent is hereby corrected as shown below:

In the Claims

Column 11, Claim 1, Line 11: Change "electode" to --electrode--

Column 12, Claim 21, Line 42: Change "cathodic" to --cationic--

Column 14, Claim 41, Line 37: After "plurality", insert --of--

Column 14, Claim 48, Line 64: Change "electodes" to --electrode--

Column 15, Claim 49, Line 1: Change "a" to --an--

Signed and Sealed this

Fourteenth Day of November, 2006

JON W. DUDAS
*Director of the United States Patent and Trademark Office*